United States Patent
Kreischer

(10) Patent No.: US 10,856,527 B1
(45) Date of Patent: Dec. 8, 2020

(54) DISAPPEARING TARGET INTERACTIVE PET TOY

(71) Applicant: Brian Kreischer, Fairport Harbor, OH (US)

(72) Inventor: Brian Kreischer, Fairport Harbor, OH (US)

(73) Assignee: COSMIC PET LLC, Wichita, KS (US)

( * ) Notice: Subject to any disclaimer, the term of this patent is extended or adjusted under 35 U.S.C. 154(b) by 63 days.

(21) Appl. No.: 16/164,828

(22) Filed: Oct. 19, 2018

Related U.S. Application Data

(60) Provisional application No. 62/575,392, filed on Oct. 21, 2017.

(51) Int. Cl.
*A01K 15/02* (2006.01)

(52) U.S. Cl.
CPC .......... *A01K 15/025* (2013.01); *A01K 15/021* (2013.01)

(58) Field of Classification Search
CPC .... A01K 15/024; A01K 15/025; A01K 1/035; A01K 15/021; A63H 11/00
USPC .......................................................... 119/707
See application file for complete search history.

(56) References Cited

U.S. PATENT DOCUMENTS

| | | | | |
|---|---|---|---|---|
| 4,903,424 A * | 2/1990 | Satoh | ..................... | A41G 1/002 40/414 |
| 5,322,036 A * | 6/1994 | Merino | ................... | A63H 15/04 119/707 |
| 5,657,721 A * | 8/1997 | Mayfield | .............. | A01K 15/025 119/707 |
| 6,164,653 A * | 12/2000 | Chuang | ................... | A63F 9/305 273/109 |
| 6,990,762 B1 * | 1/2006 | Muday | ................. | A01K 15/025 119/707 |
| 8,011,326 B2 * | 9/2011 | del Pinal | .............. | A01K 15/025 119/707 |
| 8,109,239 B1 * | 2/2012 | Smestad | .............. | A01K 15/025 119/702 |
| 8,640,653 B2 * | 2/2014 | Cook | ................... | A01K 15/025 119/707 |
| 10,314,291 B2 * | 6/2019 | Chen | ..................... | A01K 15/025 |
| 10,477,837 B1 * | 11/2019 | Liu | ....................... | A01K 15/025 |

(Continued)

*Primary Examiner* — Ebony E Evans
(74) *Attorney, Agent, or Firm* — Gugliotta & Gugliotta LPA

(57) ABSTRACT

A pet toy is provided having a hemispherical housing having a dome shaped lower surface and a motor mechanism contained within a volume formed by the housing and beneath a planar upper housing lid providing a closed upper surface to the housing. The planar lid forms a rectangular aperture. A rotating barrel shaft is mounted horizontally disposed and within the aperture such that the cylindrical outer surface that extends partially above the planar upper housing lid. The barrel shaft is rotated by the motor mechanism such that the cylindrical outer surface moves along the same plane as an upper surface of the upper lid. The cylindrical outer surface forms a receiving recess. A visually attractive target is frictionally impinged within the receiving recess. When the shaft rotates causing the outer surface to moves about the aperture such that during rotation, the target is thereby rotated about the aperture, wherein the plume element "appears" through the aperture during a portion of the shafts rotation.

6 Claims, 5 Drawing Sheets

(56) References Cited

U.S. PATENT DOCUMENTS

2015/0359194 A1* 12/2015 Coopman ............ A01K 15/024
                                                                                 119/706
2016/0324122 A1* 11/2016 Albus ................... A01K 15/025
2017/0265435 A1*  9/2017 Risso ...................... A63H 15/06
2019/0343077 A1* 11/2019 Boshears ............. A01K 15/025

* cited by examiner

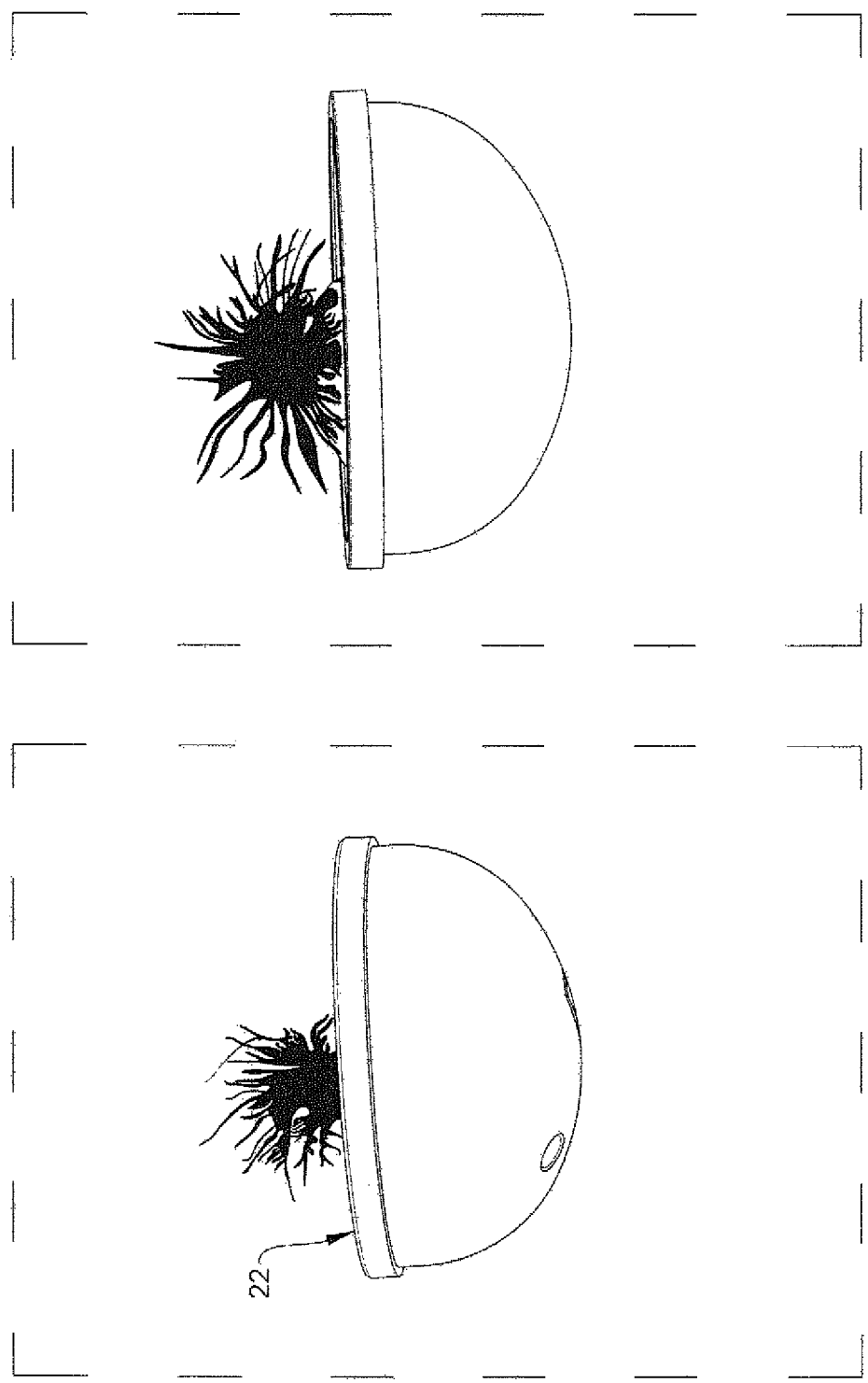

DISAPPEARING TARGET INTERACTIVE PET TOY

RELATED APPLICATIONS

The present application claims the benefit of U.S. Provisional Ser. No. 62/575,392, filed on Oct. 21, 2017 and incorporated by reference as if fully rewritten herein.

BACKGROUND OF THE INVENTION

1. Field of the Invention

The present invention relates to interactive pet toys and, more particularly, to an interactive pet toy that provides for the presentation and disappearance of a visually attractive target therefrom.

2. Description of the Related Art

Pet toys are intended to provide for healthy interaction with a pet and provide for stimulation of instincts that can exercise an animals mind or body. Many interactive pet toys will provide a motion or sound that generates a positive attraction for the pet, and hopefully will encourage greater stimulation through play. Other types of pet toys use edible treats attractants to instincts, through smell, taste or both, to generate a healthy stimulation. Many devices for promoting play and interaction with a pet are in existence today. Such toys, to be effective, must stimulate some instinctive behavior in the animal in order to garner, and retain, the animal's interest in the interaction. These toys can entertain a cat, dog or other pet; however, if the reaction of the toy becomes predictable the pet's attention tends to wain.

Motor powered toys are also known. These toys have a supported toy-like object that is moved mechanically in a manner that may attract the pet. However, this type of device does not promote interaction between the pet and the toy in that the motion imparted by the motor tends to be more automated and eventually generates a predictable movement pattern.

The above games tend to be of a type that may be labeled "pursuit-type" games, in that the toy is moved and the pet chases it. This type of game depends for its entertainment value on the pet being close enough to success in catching the toy to make the pet attempt to catch it, yet not close enough that it is overly easy. Such games often become equated by the pet to the game of "fetch". Some pets are simply uninterested in this game.

For the foregoing reasons, there is a need for a new type of pet and owner game that is more entertaining than the above summarized games. The new game should provide a structure that promotes a game that is of a type that is more nearly related to the human game of hide-and-seek, or the baby game of peekaboo, and that will capitalize on animals, particularly domestic animals innate interest in hit-and-run and am bush-type games where the hunter is rewarded for his patience. The game should be attractive to both young and old pets, and should maximize interaction between the pet and owner, while somewhat downplaying the need for continuous strenuous physical activity on the part of the pet, which may result in lessened interest.

Consequently, a need has been felt for providing a new type of pet and owner game that is of a type more nearly related to the human game of hide-and-seek, or the baby game of peekaboo, and that will capitalize on animals, particularly domestic animals innate interest in hit-and-run and ambush-type games where the hunter is rewarded for his patience.

SUMMARY OF THE INVENTION

It is thus an object of the present invention to provide a novel interactive pet toy.

It is still a feature of the present invention to utilize an appearing and disappearing target to provide interest for a pet to interact with such a toy.

The present invention provides a pet toy that provides a hemispherical housing having a dome shaped lower surface and a motor mechanism contained within a volume formed by the housing and beneath a planar upper housing lid providing a closed upper surface to the housing. The planar lid forming a rectangular aperture. A rotating barrel shaft is mounted horizontally disposed and within the aperture such that the cylindrical outer surface that extends partially above the planar upper housing lid. The barrel shaft is rotated by the motor mechanism such that the cylindrical outer surface moves along the same plane as an upper surface of the upper lid. The cylindrical outer surface forms a receiving recess. A visually attractive target is frictionally impinged within the receiving recess. When the shaft rotates causing the outer surface to moves about the aperture such that during rotation, the target is thereby rotated about the aperture, wherein the plume element "appears" through the aperture during a portion of the shafts rotation.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a front elevational view thereof;

FIG. 4 is a rear elevational view thereof;

DESCRIPTION OF THE PREFERRED EMBODIMENTS

Figure 1:
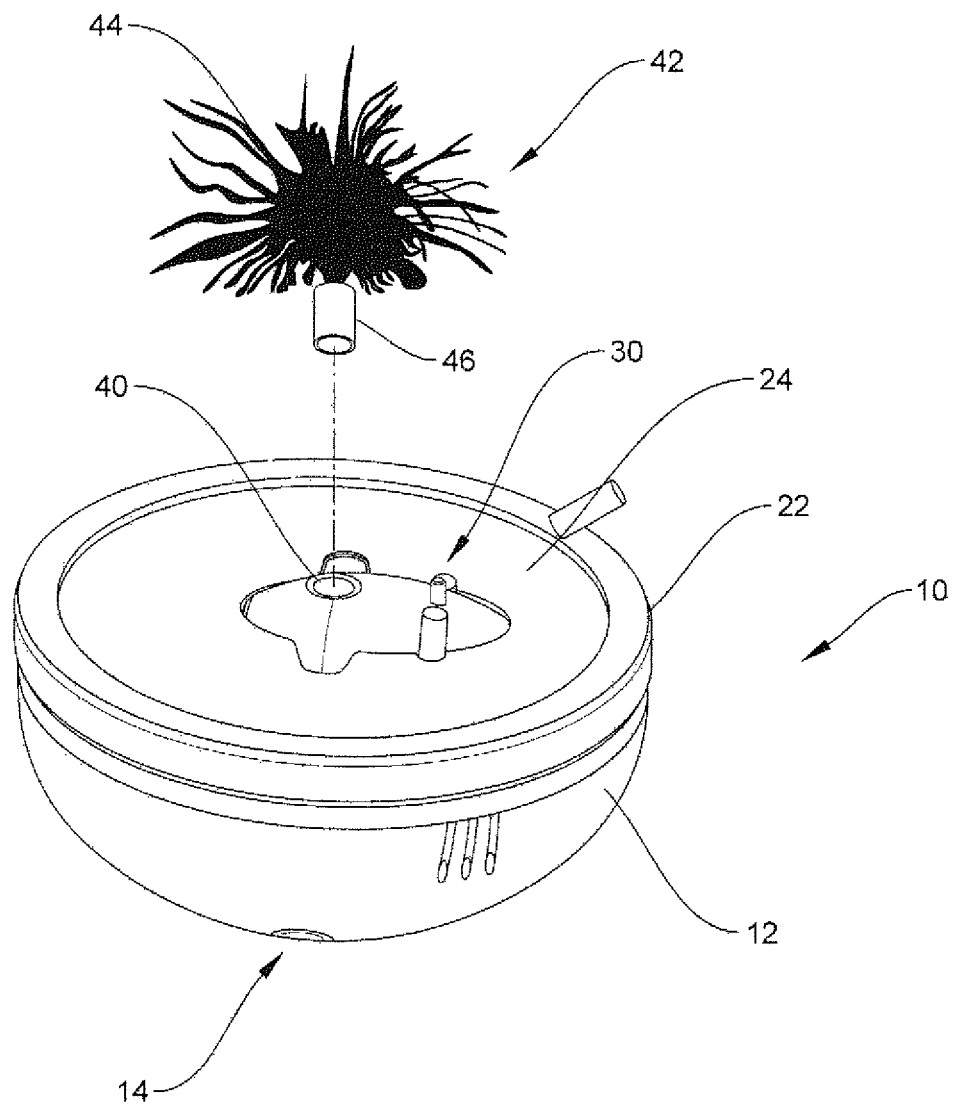
FIG. 1 is a front perspective view of a disappearing target interactive pet toy according to a preferred embodiment of the present invention.
Figure 2:
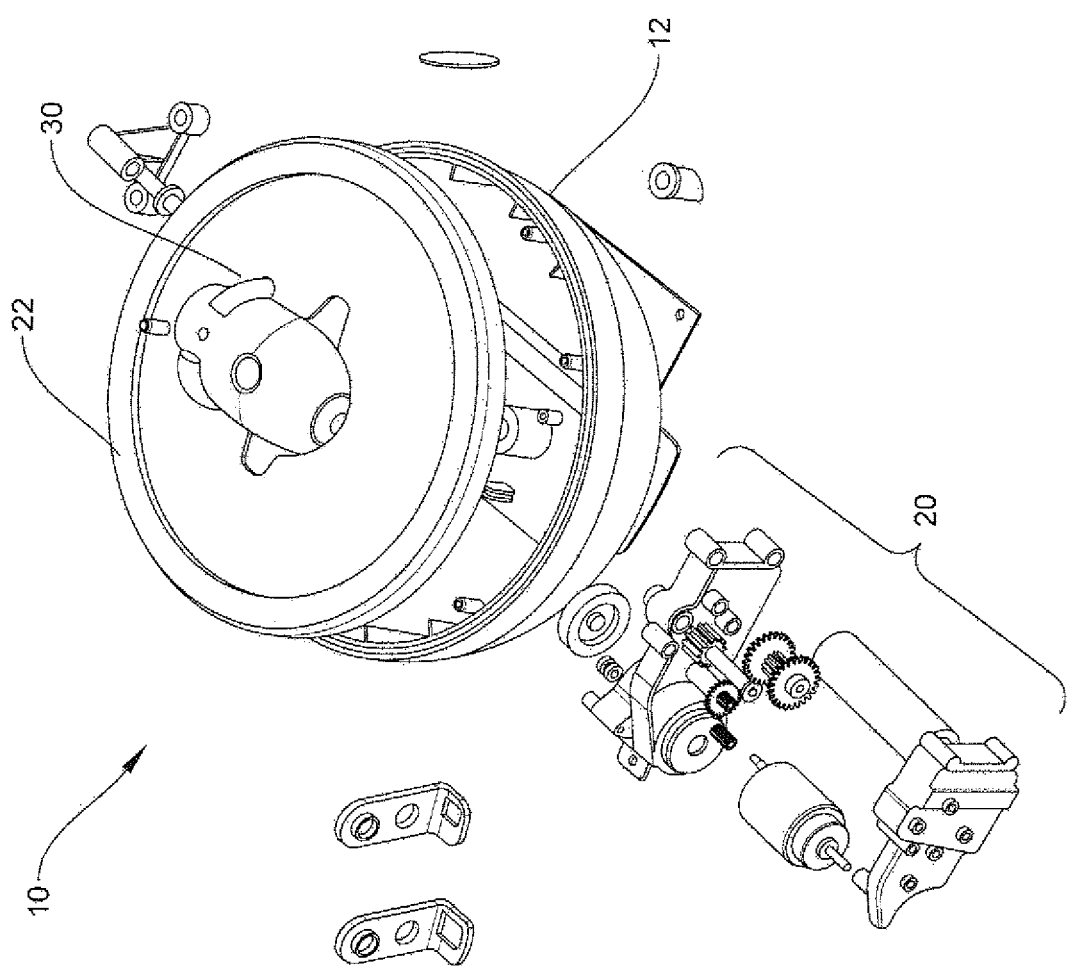
FIG. 2 is an exploded front perspective view thereof.
Figure 6:
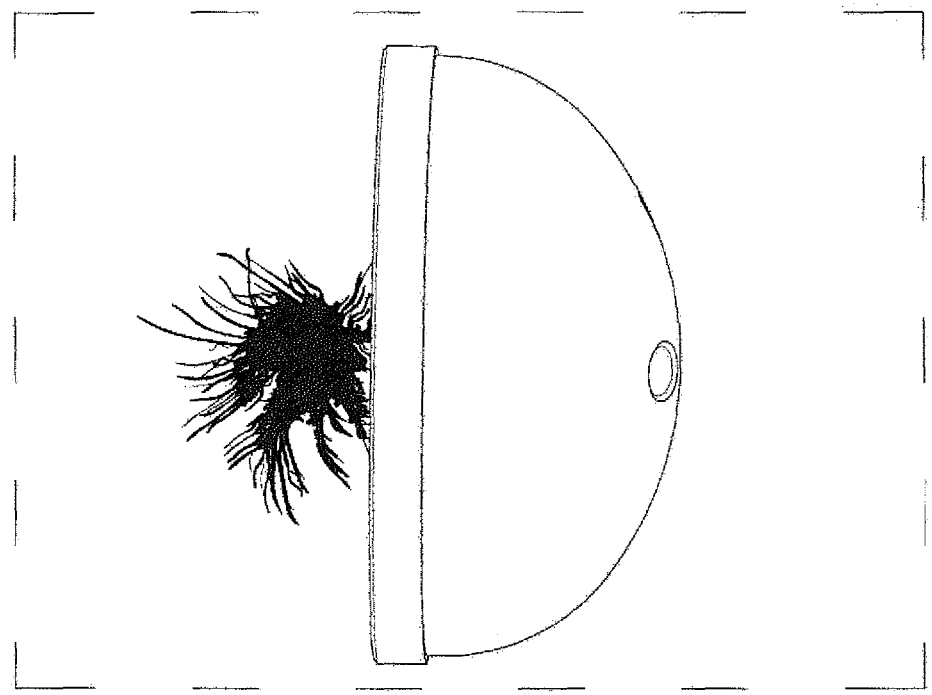
FIG. 6 is a left side elevational view thereof.
Figure 5:
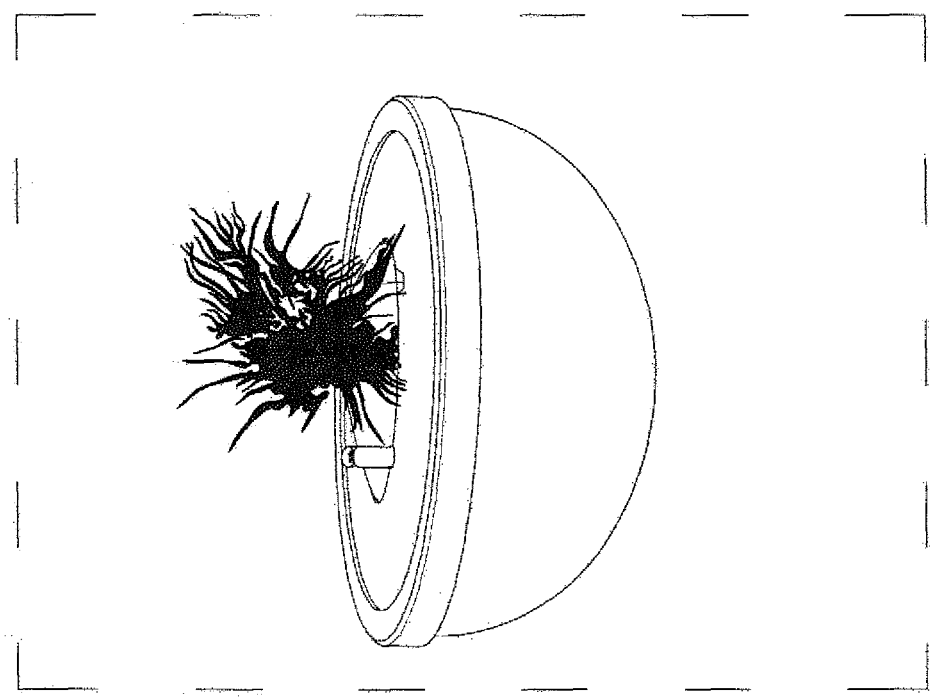
FIG. 5 is a right side elevational view thereof.
Figure 8:
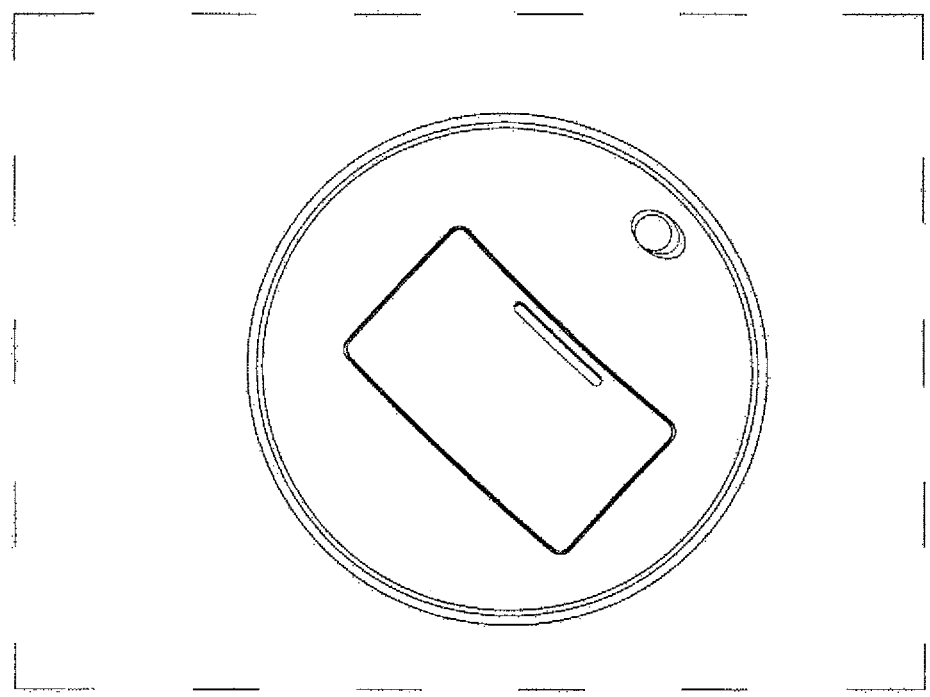
FIG. 8 is a bottom plan view thereof.
Figure 7:
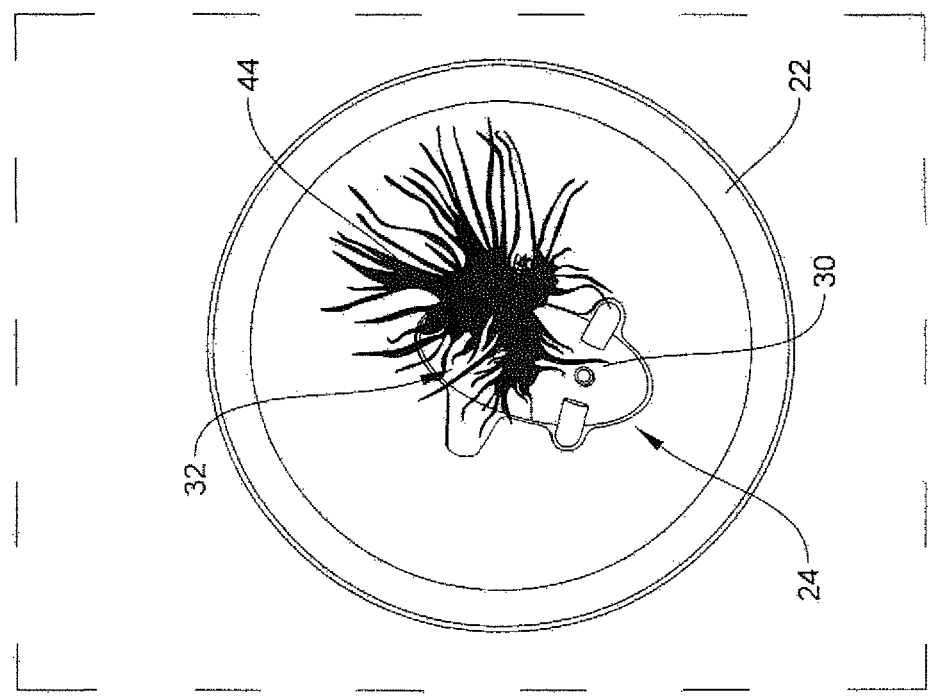
FIG. 7 is a top plan view thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, an interactive pet toy, generally noted as 10, is shown according to a preferred embodiment of the present invention. A hemispherical housing 12 is provided having a dome shaped lower surface 14 to provide to provide for a movable support that can provide for a wobbling motion when interacted with a pet. The housing 12 further contains a motor mechanism 20. A planar upper housing lid 22 provides an upper surface that forms a rectangular aperture 24. A rotating barrel shaft 30 is mounted horizontally disposed and within the aperture 24 such as to provide a cylindrical outer surface 32 that extends partially above the planar upper housing lid 22. The rotating barrel shaft 30 is rotated by the motor mechanism 20 such that the cylindrical outer surface 32 moves along the same plane as an upper surface of the upper lid 22.

The cylindrical outer surface 32 further forms a receiving recess 40. A visually attractive target 42, shown herein as a feather, includes a plume element 44 that extends from a securing plug 46. The securing plug 46 can be formed of cork, rubber or plastic material that can be frictionally impinged within the receiving recess 40. The target 42 can thereby be replaced when damaged, worn out or the like.

2. Operation of the Preferred Embodiment

In operation, a present interactive pet toy provides for stimulation of a pet through the rotational motion of the rotating barrel shaft 30. As the shaft 30 rotates, the outer surface 30 moves about the aperture 24. During the rotation, the target 42 is thereby rotated about the aperture, wherein the plume element 44 "appears" through the aperture during a portion of the shafts rotation. Once the shaft rotates further, the plume element 44 "disappears" from view as it rotates beneath the housing lid 22.

Continued rotation of the barrel 30 results in the plume 42 alternating between appearing and disappearing. This motion provides for a high degree of visual stimulation for domestic pets, especially felines and many breeds of canine. As the animal investigates or contacts the target, the dome shaped housing can further wobble and move such as to further stimulate an animal's chase instincts.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. In addition to the dispensing of edible treats the pet toy 10 may include additional interactive mechanism for capturing or retaining the attention of a pet. These may include, but are not limited to, the inclusion of audible generating devices, such as a sound device that preferably emits a prerecorded sound in response to movement or propulsion/retraction of the pet. This prerecorded sound can be a "permanent" prerecorded sound such as an animal's voice, such as "meow" or "purr," a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird. Such improvements and are submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this patent Application.

What is claimed is:

1. An interactive pet toy that provides for the rotation of a flexible visual target that alternately appear and disappear from view comprising:

a hemispherical housing having a dome shaped lower surface;

a motor mechanism contained within a volume formed by said housing;

a planar upper housing lid providing a closed upper surface to said housing and forming an aperture;

a rotating barrel shaft mounted horizontally disposed and within the aperture such as to provide an outer surface that extends partially above the planar upper housing lid, said barrel shaft terminating with the flexible visual target;

wherein said rotating barrel shaft is rotated by the motor mechanism such that the outer surface moves about a perimeter of an upper surface of the planar upper housing lid.

2. The interactive pet toy of claim 1, wherein said outer surface forms a receiving recess.

3. The interactive pet toy of claim 2, wherein said flexible visual target comprises a plume element that extends from a securing plug, said securing plug being frictionally impinged within the receiving recess, wherein said target can thereby be replaced.

4. The interactive pet toy of claim 3, wherein said securing plug is formed of cork, rubber or plastic.

5. The interactive pet toy of claim 4, wherein said shaft rotates causing the outer surface to moves about the aperture such that during rotation, the target is thereby rotated about the aperture, wherein the plume element egresses through the aperture during a portion of the shaft's rotation.

6. The interactive pet toy of claim 5, wherein as the shaft rotates further, the plume element disappears from view as it rotates beneath the housing lid.

\* \* \* \* \*